US012584994B2

(12) United States Patent
Khlat et al.

(10) Patent No.: US 12,584,994 B2
(45) Date of Patent: Mar. 24, 2026

(54) WIRELESS DEVICE OPERABLE TO DETECT A NEARBY OBJECT

(71) Applicant: Qorvo US, Inc., Greensboro, NC (US)

(72) Inventors: Nadim Khlat, Cugnaux (FR); Robert Aigner, Ocoee, FL (US)

(73) Assignee: Qorvo US, Inc., Greensboro, NC (US)

( * ) Notice: Subject to any disclaimer, the term of this patent is extended or adjusted under 35 U.S.C. 154(b) by 197 days.

(21) Appl. No.: 18/348,552

(22) Filed: Jul. 7, 2023

(65) Prior Publication Data

US 2024/0027576 A1 Jan. 25, 2024

Related U.S. Application Data

(60) Provisional application No. 63/390,681, filed on Jul. 20, 2022.

(51) Int. Cl.
| | |
|---|---|
| *G01S 7/28* | (2006.01) |
| *G01S 13/02* | (2006.01) |
| *G01S 13/04* | (2006.01) |

(52) U.S. Cl.
CPC ........ *G01S 7/2806* (2013.01); *G01S 13/0209* (2013.01); *G01S 13/04* (2013.01)

(58) Field of Classification Search
CPC ..... G01S 7/2806; G01S 13/0209; G01S 13/04
See application file for complete search history.

(56) References Cited

U.S. PATENT DOCUMENTS

| | | | |
|---|---|---|---|
| 2,872,673 | A | 2/1959 | Pleasure |
| 4,682,358 | A | 7/1987 | Werner |
| 4,801,836 | A | 1/1989 | Mariani |
| 7,155,263 | B1 | 12/2006 | Bergamo |

(Continued)

FOREIGN PATENT DOCUMENTS

| | | |
|---|---|---|
| EP | 1016241 A2 | 7/2000 |
| EP | 3993512 A1 | 5/2022 |

(Continued)

OTHER PUBLICATIONS

KR20200131526Atranslation.pdf, machine translation of KR-20200131526-A (Year: 2020).*

(Continued)

*Primary Examiner* — William Kelleher
*Assistant Examiner* — Kenneth W Good
(74) *Attorney, Agent, or Firm* — Withrow & Terranova, P.L.L.C.

(57) ABSTRACT

A wireless device operable to detect a nearby object is disclosed. Herein, an object is considered a nearby object when a roundtrip propagation duration of a pulse(s) between an antenna and the object is less than two nanoseconds (2 ns). Given the close proximity of the object, an echo of the emitted pulse(s) may be reflected instantaneously toward the antenna to potentially overlap with the emitted pulse(s), thus causing difficulty in detecting the reflected pulse(s). In this regard, in embodiments disclosed herein, an acoustic delay circuit is provided in the wireless device to add a temporal delay in the emitted pulse(s) and the reflected pulse(s) to prevent the reflected pulse(s) from overlapping with the emitted pulse(s). As a result, the wireless device can accurately receive the reflected pulse(s) to thereby detect the nearby object.

20 Claims, 7 Drawing Sheets

(56) References Cited

U.S. PATENT DOCUMENTS

| | | | |
|---|---|---|---|
| 8,164,416 | B2 | 4/2012 | Lee et al. |
| 8,543,002 | B1 | 9/2013 | Mui |
| 9,386,524 | B2 | 7/2016 | Feuersaenger et al. |
| 9,537,543 | B2 | 1/2017 | Choi |
| 10,310,069 | B2 | 6/2019 | Younis |
| 10,663,559 | B2 | 5/2020 | Huemer et al. |
| 11,451,209 | B2 * | 9/2022 | Gong ...................... H01Q 3/22 |
| 2005/0122944 | A1 | 6/2005 | Kwon et al. |
| 2005/0152305 | A1 | 7/2005 | Ji et al. |
| 2010/0159866 | A1 | 6/2010 | Fudge et al. |
| 2011/0140851 | A1 | 6/2011 | Lee et al. |
| 2011/0200026 | A1 | 8/2011 | Ji et al. |
| 2014/0211678 | A1 | 7/2014 | Jafarian et al. |
| 2015/0081040 | A1 | 3/2015 | Apte et al. |
| 2015/0350027 | A1 | 12/2015 | Raissinia et al. |
| 2016/0173662 | A1 | 6/2016 | Seok |
| 2016/0337973 | A1 | 11/2016 | Park et al. |
| 2016/0344574 | A1 | 11/2016 | Choi et al. |
| 2017/0187415 | A1 | 6/2017 | Choi |
| 2017/0288639 | A1 * | 10/2017 | Elsherbini .............. H03H 9/133 |
| 2017/0331456 | A1 * | 11/2017 | Ono ....................... H03H 9/725 |
| 2018/0009112 | A1 | 1/2018 | Williams |
| 2018/0084501 | A1 | 3/2018 | Mu et al. |
| 2018/0110000 | A1 | 4/2018 | Shellhammer et al. |
| 2018/0132177 | A1 | 5/2018 | Gandhi et al. |
| 2018/0254925 | A1 | 9/2018 | Dutz et al. |
| 2019/0090191 | A1 | 3/2019 | Liu et al. |
| 2019/0116555 | A1 | 4/2019 | Kristem et al. |
| 2019/0162843 | A1 | 5/2019 | Jiang et al. |
| 2019/0306811 | A1 | 10/2019 | Balakrishnan et al. |
| 2020/0249351 | A1 | 8/2020 | Chen et al. |
| 2020/0252131 | A1 | 8/2020 | Jang et al. |
| 2020/0358422 | A1 * | 11/2020 | Northcutt ................. H03H 9/10 |
| 2021/0119602 | A1 | 4/2021 | Lu et al. |
| 2021/0119606 | A1 * | 4/2021 | Lu ...................... H03H 9/02559 |
| 2023/0007443 | A1 | 1/2023 | Moon |
| 2023/0035736 | A1 | 2/2023 | Bingesser et al. |
| 2023/0139079 | A1 | 5/2023 | McLaughlin et al. |
| 2023/0266431 | A1 | 8/2023 | Perraud |
| 2023/0296753 | A1 | 9/2023 | Khlat et al. |
| 2024/0036158 | A1 | 2/2024 | Khlat |
| 2024/0103113 | A1 | 3/2024 | Qian et al. |
| 2024/0118375 | A1 | 4/2024 | Dong et al. |
| 2024/0179494 | A1 | 5/2024 | Säily et al. |
| 2024/0219559 | A1 | 7/2024 | Shin |
| 2025/0151018 | A1 | 5/2025 | Zhang et al. |

FOREIGN PATENT DOCUMENTS

| | | | | |
|---|---|---|---|---|
| KR | 20200131526 | A | * 11/2020 | ......... G01S 13/0209 |
| WO | 2016138483 | A1 | 9/2016 | |
| WO | 2020212723 | A1 | 10/2020 | |
| WO | 2021026657 | A1 | 2/2021 | |
| WO | 2021209352 | A1 | 10/2021 | |
| WO | 2023081158 | A1 | 5/2023 | |

OTHER PUBLICATIONS

Dissanayake, A. et al., "A-108dBm Sensitivity, -28dB SIR, 130nW to 41μW, Digitally Reconfigurable Bit-Level Duty-Cycled Wakeup and Data Receiver," 2020 IEEE Custom Integrated Circuits Conference (CICC), Mar. 22-25, 2020, Boston, MA, USA, IEEE, 4 pages.

Goe, C. et al., "The Advantages of UWB Wakeup," Project: IEEE P802.15 Working Group for Wireless Specialty Networks (WSN), May 2022, IEEE, 14 pages.

Hoang, H. et al., "A Cluster-Based Protocol for Self-Organizing UWB Wireless Ad hoc Sensor Networks," Proceedings of the 2009 IEEE International Conference on Systems, Man, and Cyberneticsm Oct. 2009, San Antonio, TX, USA, IEEE, 6 pages.

Klumperink et al., "N-path filters and Mixer-First Receivers: A Review," 2017 IEEE Custom Integrated Circuits Conference (CICC), Apr. 30, 2017-May 3, 2017, Austin, TX, USA, IEEE, 8 pages.

Mclaughlin, M. et al., "UWB Wakeup Signalling," Project IEEE P802.15 Working Group, Nov. 2021, IEEE, 25 pages.

Moody, J et al., "A-106dBm 33nW Bit-Level Duty-Cycled Tuned RF Wake-up Receiver," IEEE Solid-State Circuits Letters, vol. 2, Issue 12, Dec. 2019, IEEE, 2 pages.

Salonidis, T. et al., "Distributed Topology Construction of Bluetooth Personal Area Networks," Proceedings of IEEE INFOCOM 2001, Conference on Computer Communications, Twentieth Annual Joint Conference of the IEEE Computer and Communications Society (Cat. No. 01CH37213), Apr. 22-26, 2001, Anchorage, AK, USA, IEEE, 10 pages.

International Search Report and Written Opinion for International Patent Application No. PCT/US2022/048600, mailed Feb. 1, 2023, 17 pages.

ISO/IEC, "Information Technology—Radio Frequency Identification (RFID) for Item Management—Part 6: Parameters for Air Interface Communications at 860-930 MHz," ISO/IEC CD 18000-6, May 4, 2002, 129 pages.

Extended European Search Report for European Patent Application No. 22205008.0, mailed Mar. 9, 2023, 10 pages.

Biedka, M.M. et al., "Ultra-Wide Band Non-reciprocity through Sequentially-Switched Delay Lines," Scientific Reports, vol. 7, Article No. 40014, Jan. 2017, 16 pages.

Lee, H.L. et al., "Compact Antenna Module With Optimized Tx-to-Rx Isolation for Monostatic RFID," IEEE Microwave and Wireless Components Letters, vol. 27, No. 2, Dec. 2017, IEEE, pp. 1161-1163.

Lurz, F. et al., "Reader Architectures for Wireless Surface Acoustic Wave Sensors," Sensors, vol. 18, No. 6, May 2018, MDPI, 34 pages.

Sipos, D. et al., "SFCW Radar with an Integrated Static Target Echo Cancellation System," Sensors (Basel), vol. 21, No. 17, Sep. 2021, MDPI, 23 pages.

Hussain, Z., "Performance Evaluation of Wake-Up Radio Based Wireless Body Area Network," Master's Thesis, Degree Programme in Wireless Communications Engineering, University of Oulu, Oct. 2016, 58 pages.

Verso, B. et al., "Draft text for UWB wake-up radio," IEEE P802.15 Working Group for Wireless Personal Area Networks (WPANs), Nov. 2022, 7 pages.

Extended European Search Report for European Patent Application No. 24166667.6, mailed Jul. 10, 2024, 10 pages.

* cited by examiner

ACOUSTIC DEVICE 52B

54

56

62
66
64

PIEZO-LAYER 70

ANTI-REFLECTION LAYER(S) 68

SUBSTRATE 60

ANTI-REFLECTION LAYER(S) 72

PIEZO-LAYER 74

ANTI-REFLECTION LAYER(S) 76

ABSORBER LAYER 78

32, 32'

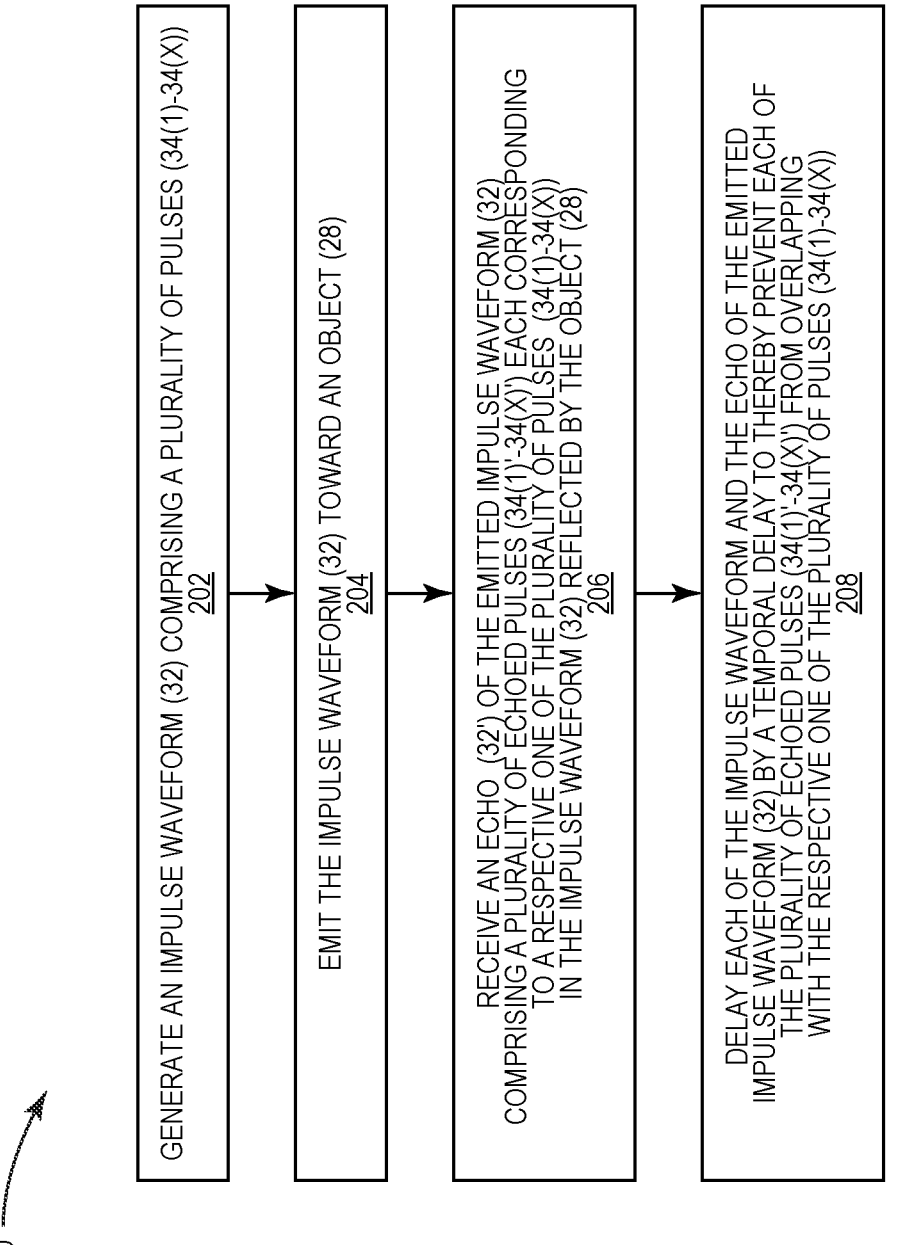

GENERATE AN IMPULSE WAVEFORM (32) COMPRISING A PLURALITY OF PULSES (34(1)-34(X))
202

EMIT THE IMPULSE WAVEFORM (32) TOWARD AN OBJECT (28)
204

RECEIVE AN ECHO (32') OF THE EMITTED IMPULSE WAVEFORM (32) COMPRISING A PLURALITY OF ECHOED PULSES (34(1)'-34(X)') EACH CORRESPONDING TO A RESPECTIVE ONE OF THE PLURALITY OF PULSES (34(1)-34(X)) IN THE IMPULSE WAVEFORM (32) REFLECTED BY THE OBJECT (28)
206

DELAY EACH OF THE IMPULSE WAVEFORM AND THE ECHO OF THE EMITTED IMPULSE WAVEFORM (32) BY A TEMPORAL DELAY TO THEREBY PREVENT EACH OF THE PLURALITY OF ECHOED PULSES (34(1)'-34(X)') FROM OVERLAPPING WITH THE RESPECTIVE ONE OF THE PLURALITY OF PULSES (34(1)-34(X))
208

WIRELESS DEVICE OPERABLE TO DETECT A NEARBY OBJECT

RELATED APPLICATIONS

This application claims the benefit of U.S. provisional patent application Ser. No. 63/390,681, filed on Jul. 20, 2022, the disclosure of which is hereby incorporated herein by reference in its entirety.

FIELD OF THE DISCLOSURE

The technology of the disclosure relates generally to wireless detection of a nearby object.

BACKGROUND

Ultra-wideband (UWB) is an Institute of Electrical and Electronic Engineers (IEEE) 802.15.4a/z standard technology optimized for secure micro-location-based applications. It is capable of measuring distance and location with extended range (e.g., up to 70 meters) and unprecedented accuracy (e.g., within a few centimeters), compared to such traditional narrowband technologies as Wi-Fi and Bluetooth. In addition to location capability, UWB can also offer a data communication pipe of 27+ Mbps. As such, UWB technology has been widely adopted in today's new smartphones and smart gadgets to enable spatial awareness, object detection, and secure data collection from various sensors.

UWB based positioning service is enabled by transmitting a UWB pulse(s) from an anchor (e.g., smartphone) to an object (e.g., a UWB tag) and calculating the time it takes the UWB pulse(s) to travel between the anchor and the object. The UWB pulse(s) is typically 2 nanoseconds (ns) wide and has clean edges, thus making it highly immune to reflected signals (e.g., multipath) and allowing a precise determination of arrival time and distance in a multipath radio environment (e.g., an indoor environment).

SUMMARY

Embodiments of the disclosure relate to a wireless device operable to detect a nearby object. Herein, an object is considered a nearby object when a roundtrip propagation duration of a pulse(s) between an antenna and the object is less than two nanoseconds (2 ns). Given the close proximity of the object, an echo of the emitted pulse(s) may be reflected instantaneously toward the antenna to potentially overlap with the emitted pulse(s), thus causing difficulty in detecting the reflected pulse(s). In this regard, in embodiments disclosed herein, an acoustic delay circuit is provided in the wireless device to add a temporal delay in the emitted pulse(s) and the reflected pulse(s) to prevent the reflected pulse(s) from overlapping with the emitted pulse(s). As a result, the wireless device can accurately receive the reflected pulse(s) to thereby detect the nearby object.

In one aspect, a wireless device is provided. The wireless device includes a transmitter circuit. The transmitter circuit is configured to generate an impulse waveform. The wireless device also includes an antenna port. The antenna port is coupled to an antenna. The antenna is configured to emit the impulse waveform toward an object and absorb an echo of the emitted impulse waveform reflected by the object. The wireless device also includes a receiver circuit. The receiver circuit is configured to receive the echo of the emitted impulse waveform. The wireless device also includes an acoustic delay circuit. The acoustic delay circuit is configured to receive the impulse waveform from the transmitter circuit. The acoustic delay circuit is also configured to delay the impulse waveform by a temporal delay. The acoustic delay circuit is also configured to provide the delayed impulse waveform to the antenna port. The acoustic delay circuit is also configured to receive the echo of the emitted impulse waveform from the antenna port. The acoustic delay circuit is also configured to delay the echo of the emitted impulse waveform by the temporal delay. The acoustic delay circuit is also configured to provide the delayed echo of the emitted impulse waveform to the receiver circuit.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 6 is a flowchart of an exemplary process whereby the wireless device of FIG. 2 can detect the nearby object.

DETAILED DESCRIPTION

Figure 1:
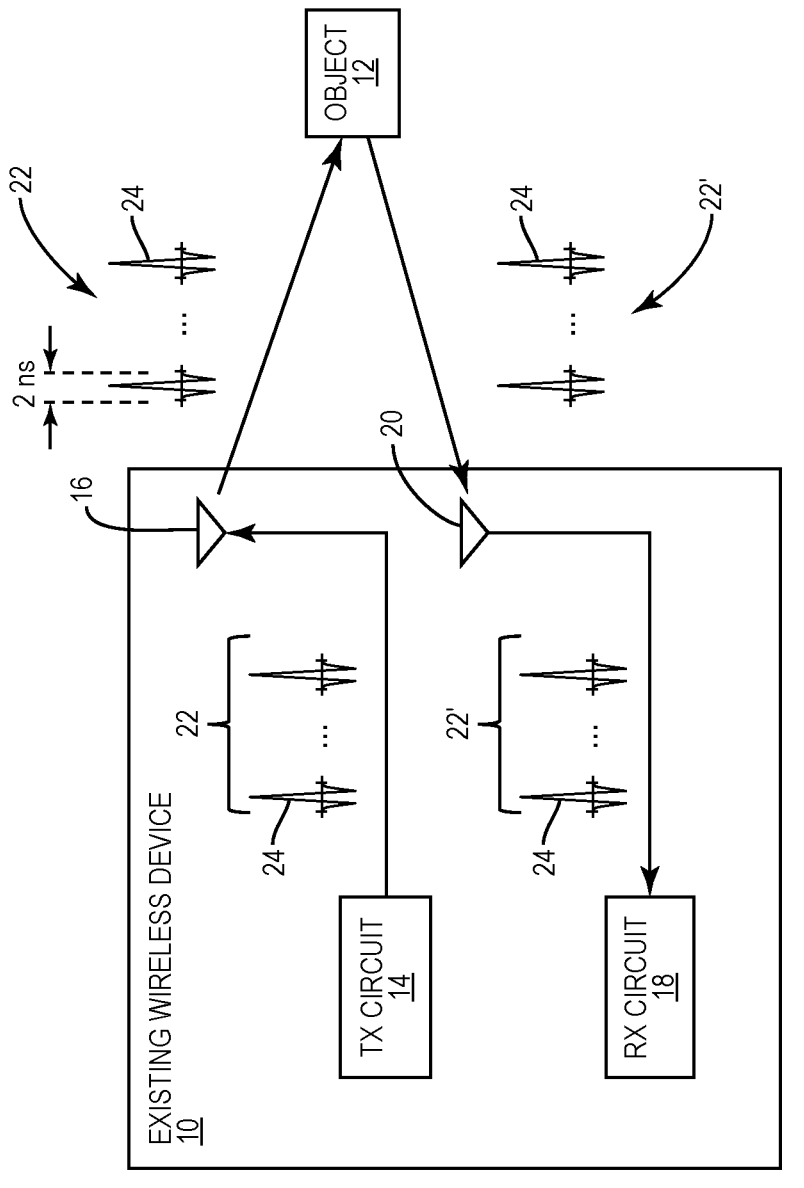
FIG. 1 is a schematic diagram of an exemplary existing wireless device having difficulty detecting a nearby object.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the disclosure relate to a wireless device operable to detect a nearby object. Herein, an object is considered a nearby object when a roundtrip propagation duration of a pulse(s) between an antenna and the object is less than two nanoseconds (2 ns). Given the close proximity of the object, an echo of the emitted pulse(s) may be reflected instantaneously toward the antenna to potentially overlap with the emitted pulse(s), thus causing difficulty in detecting the reflected pulse(s). In this regard, in embodiments disclosed herein, an acoustic delay circuit is provided in the wireless device to add a temporal delay in the emitted pulse(s) and the reflected pulse(s) to prevent the reflected pulse(s) from overlapping with the emitted pulse(s). As a result, the wireless device can accurately receive the reflected pulse(s) to thereby detect the nearby object.

Before discussing the wireless device of the present disclosure, starting at FIG. 2, a brief overview of an existing wireless device is first discussed with reference to FIG. 1 to help understand existing challenges related to detecting a nearby object.

FIG. 1 is a schematic diagram of an exemplary existing wireless device 10 having difficulty detecting a nearby object 12. The existing wireless device 10 includes a transmitter circuit 14 coupled to a transmitting antenna 16 and a receiver circuit 18 coupled to a receiving antenna 20. To detect the nearby object 12, the transmitter circuit 14 generates an impulse waveform 22 that includes a burst of pulses 24 and the transmitting antenna 16 emits the impulse waveform 22 towards the nearby object 12. When the impulse waveform 22 hits the nearby object 12, the pulses 24 are reflected by the nearby object 12. As a result, an echo 22' of the emitted impulse waveform (referred to as "echoed impulse waveform" for brevity) can be absorbed by the receiving antenna 20 and received by the receiver circuit 18. Accordingly, the existing wireless device 10 may detect the nearby object 12 and determine a distance to the nearby object 12 based on a roundtrip propagation duration of the impulse waveform 22.

In a non-limiting example, the impulse waveform 22 can be an ultra-wideband (UWB) waveform, wherein each of the pulses 24 has a pulse width of approximately two nanoseconds (2 ns). The nearby object 12, on the other hand, may be in close proximity (e.g., 10 centimeters) to the existing wireless device 10. In this regard, the roundtrip propagation duration of the impulse waveform 22 can be as short as three-tenths of a nanosecond (0.3 ns), far shorter than the pulse width of the pulses 24. As such, the pulses 24 emitted from the transmitting antenna 16 will be echoed back toward the receiving antenna 20 almost instantaneously. Since the emitted pulses 24 typically have a higher power than the echoed pulses 24, the receiver circuit 18 may have difficulty detecting the echoed pulses 24 due to, for example, receiver saturation. As a result, the existing wireless device 10 may have difficulty detecting the nearby object 12.

Further, by employing both the transmitting antenna 16 and the receiving antenna 20, the existing wireless device 10 may need a larger footprint and be associated with a higher cost. As such, it is desirable to detect the nearby object 12 with a single antenna to help reduce footprint and cost of the existing wireless device 10.

Figure 2:
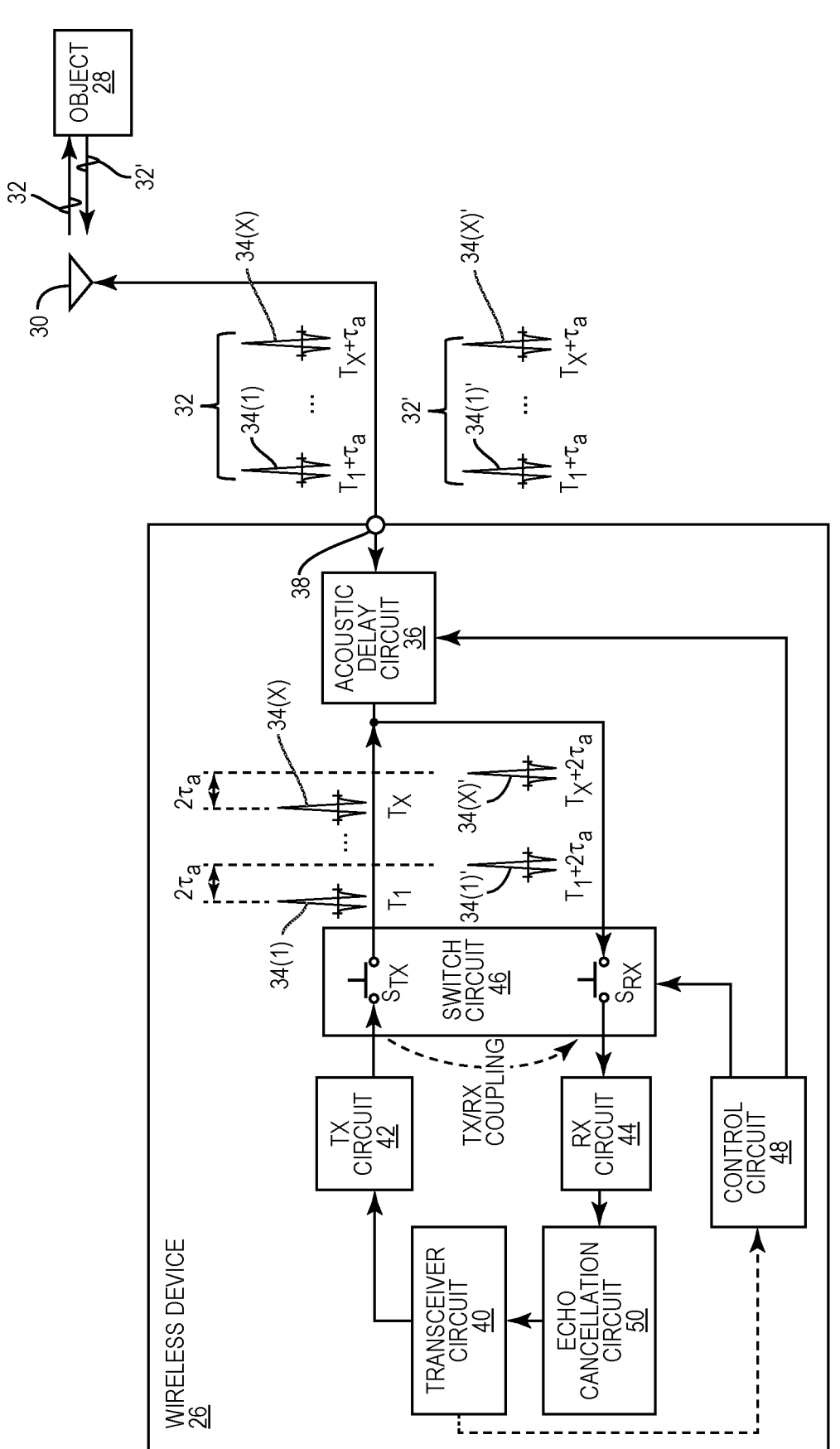
FIG. 2 is a schematic diagram of an exemplary wireless device configured according to embodiments of the present disclosure to detect a nearby object based on a single antenna.

In this regard, FIG. 2 is a schematic diagram of an exemplary wireless device 26 configured according to embodiments of the present disclosure to detect a nearby object 28 based on a single antenna 30. Similar to the existing wireless device 10 of FIG. 1, the wireless device 26 is configured to detect the nearby object 28 by emitting an impulse waveform 32, which includes a burst of pulses 34(1)-34(X), toward the nearby object 28, and detecting an echo 32' of the emitted impulse waveform 32 (referred to interchangeably as "echoed impulse waveform"), which includes echoes 34(1)'-34(X)' of the emitted pulses 34(1)-34(X) (referred to interchangeably as "echoed pulses"), reflected by the nearby object 28. In a non-limiting example, the impulse waveform 32 can be a UWB waveform generated according to an Institute of Electrical and Electronic Engineers (IEEE) 802.15.4a/z standard.

In contrast to the existing wireless device 10, the wireless device 26 includes an acoustic delay circuit 36, which is coupled to the antenna 30 via an antenna port 38. The acoustic delay circuit 36 is different from a conventional delay circuit in that the acoustic delay circuit 36 can provide a much wider bandwidth (e.g., 250 MHz) than the conventional delay circuit. As such, the acoustic delay circuit 36 can avoid distortion in the emitted impulse waveform 32 and the echoed impulse waveform 32' across an operating bandwidth of UWB.

According to an embodiment of the present disclosure, the acoustic delay circuit 36 is configured to add a temporal delay Ta to each of the pulses 34(1)-34(X) before providing the pulses 34(1)-34(X) to the antenna port 38. In addition, the acoustic delay circuit 36 is also configured to add the temporal delay $\tau_a$ received via the antenna port 38 to each of the echoed pulses 34(1)'-34(X)'. By adding the temporal delay $\tau_a$ in both the emitted pulses 34(1)-34(X) and the echoed pulses 34(1)'-34(X)', it is possible to avoid overlapping between the emitted pulses 34(1)-34(X) and the echoed pulses 34(1)'-34(X)', thus making it possible for the wireless device 26 to detect the nearby object 28. Further, by emitting the impulse waveform 32 and absorbing the echoed impulse waveform 32' via the single antenna 30, the wireless device 26 can be smaller in footprint and cheaper in cost compared to the existing wireless device 10.

The wireless device 26 includes a transceiver circuit 40, a transmitter circuit 42, a receiver circuit 44, and a switch circuit 46. The transceiver circuit 40 may include a protocol stack (not shown) for supporting UWB physical (PHY) layer and medium access control (MAC) layer protocols. The transceiver circuit can also include a baseband circuit (not shown) for generating the impulse waveform 32 according to the UWB standard and processing the echoed impulse waveform 32' to thereby detect the nearby object 28. The transmitter circuit 42 and the receiver circuit 44 may include active and/or passive circuits such as power amplifiers, low-noise amplifiers (LNA), transmit/receive filters, digital to analog converters (DAC), analog-to-digital converters (ADC), and frequency converters to process the impulse waveform 32 before transmission and to process the echoed impulse waveform 32' after reception. The switch circuit 46 may include a transmit switch $S_{TX}$ and a receive switch $S_{RX}$. In a non-limiting example, the transmit switch $S_{TX}$ and the receive switch $S_{RX}$ are silicon-on-insulator (SOI) switches that can be toggled between on and off with a very short switching delay. The transmit switch $S_{TX}$ is configured to couple (when turned on) or decouple (when turned off) the transmitter circuit 42 to or from the acoustic delay circuit 36. The receive switch $S_{RX}$, on the other hand, is configured to couple (when turned on) or decouple (when turned off) the receiver circuit 44 to or from the acoustic delay circuit 36. According to an embodiment of the present disclosure, only one of the transmit switch $S_{TX}$ and the receive switch $S_{RX}$ can be turned on at any given time such that the antenna 30 can be shared between the transmitter circuit 42 and the receiver circuit 44. The wireless device 26 can include a control circuit 48, such as a field-programmable gate array (FPGA), that controls the transmit switch $S_{TX}$ and the receive switch $S_{RX}$ based on a time-division scheme.

To transmit the impulse waveform 32, the control circuit 48 closes the transmit switch $S_{TX}$ and opens the receive switch $S_{RX}$ concurrently to couple the transmitter circuit 42 to the acoustic delay circuit 36 and decouple the receiver circuit 44 from the acoustic delay circuit 36. Accordingly, the transmitter circuit 42 can provide the pulses 34(1)-34(X) to the acoustic delay circuit 36. Herein, the pulses 34(1)-34(X) outputted from the transmitter circuit 42 are each associated with a respective one or multiple timestamps $T_1$-$T_X$. The acoustic delay circuit 36 adds the temporal delay $\tau_a$ to each of the pulses 34(1)-34(X) such that the pulses 34(1)-34(X) will each be associated with a respective one of multiple delayed timestamps $(T_1+\tau_a)-(T_X+\tau_a)$ when the impulse waveform 32 is emitted from the antenna 30.

To receive the echoed impulse waveform 32', the control circuit 48 closes the receive switch $S_{RX}$ and opens the transmit switch $S_{TX}$ concurrently to couple the receiver circuit 44 to the acoustic delay circuit 36 and decouple the transmitter circuit 42 from the acoustic delay circuit 36. Accordingly, the receiver circuit 44 can receive the echoed pulses 34(1)'-34(X)' from the acoustic delay circuit 36. The acoustic delay circuit 36 adds the temporal delay $\tau_a$ to each of the echoed pulses 34(1)'-34(X)' such that the echoed pulses 34(1)'-34(X)' will each be associated with a respective one of multiple delayed timestamps $(T_1+2\tau_a)-(T_X+2\tau_a)$ when the echoed impulse waveform 32' is provided to the receiver circuit 44. In this regard, each of the echoed pulses 34(1)'-34(X)' is delayed by $2\tau_a$ from a respective one of the pulses 34(1)-34(X) outputted from the transceiver circuit 40.

Notably, it is possible that the transmit switch $S_{TX}$ and the receive switch $S_{RX}$ can introduce an undesired echo in the echoed impulse waveform 32' due to, for example, TX/RX coupling. In this regard, the wireless device 26 can further include an echo cancellation circuit 50 to cancel the undesired echo in the echoed impulse waveform 32' before providing the echoed impulse waveform 32' to the transceiver circuit 40. In a non-limiting example, the echo cancellation circuit 50 can be pre-calibrated to store the undesired echo caused by the transmit switch $S_{TX}$ and configured to cancel the undesired echo based on the locally stored calibration data.

Figure 3:
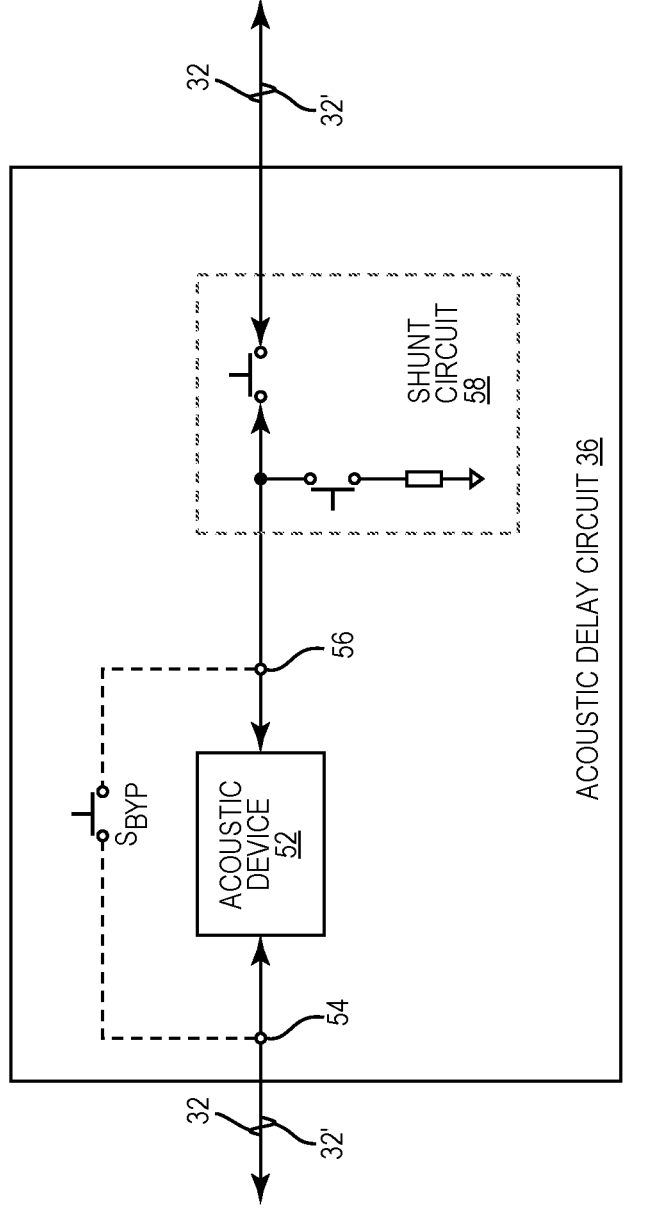
FIG. 3 is a schematic diagram of an acoustic delay circuit in the wireless device of FIG. 2.

FIG. 3 is a schematic diagram of the acoustic delay circuit 36 configured according to an embodiment of the present disclosure. Common elements between FIGS. 2 and 3 are shown therein with common element numbers and will not be re-described herein.

The acoustic delay circuit 36 includes an acoustic device 52, which can be a bulk acoustic wave (BAW) device, as an example. The acoustic delay circuit 36 may also include a bypass switch $S_{BYP}$ coupled between an input port 54 and an output port 56 of the acoustic device 52. In an embodiment, the control circuit 48 may open the bypass switch $S_{BYP}$ when the wireless device 26 is configured to detect the nearby object 28. In case the wireless device 26 is not configured to or does not need to detect the nearby object 12, the control circuit 48 may close the bypass switch $S_{BYP}$ to thereby bypass the acoustic device 52.

The acoustic delay circuit 36 may also include a shunt circuit 58, which can be an acoustic shunt circuit, as an example. In a non-limiting example, the shunt circuit 58 can help pre-calibration of the echo cancellation circuit 50 and/or elimination of the undesired echo introduced by the transmit switch $S_{TX}$.

Figure 4A:
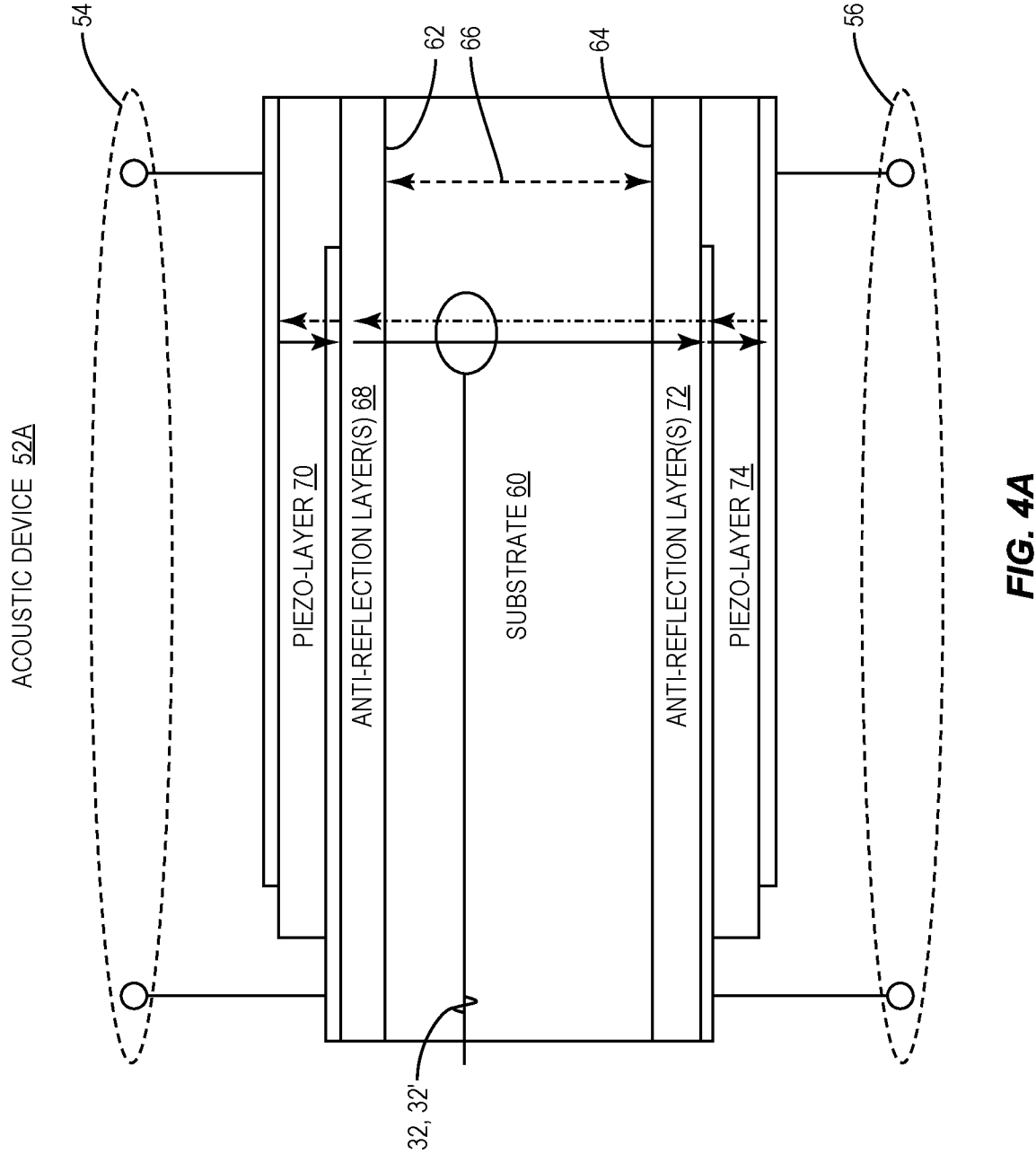
FIGS. 4A and 4B are schematic diagrams of exemplary acoustic devices in the acoustic delay circuit in FIG. 3.
Figure 4B:
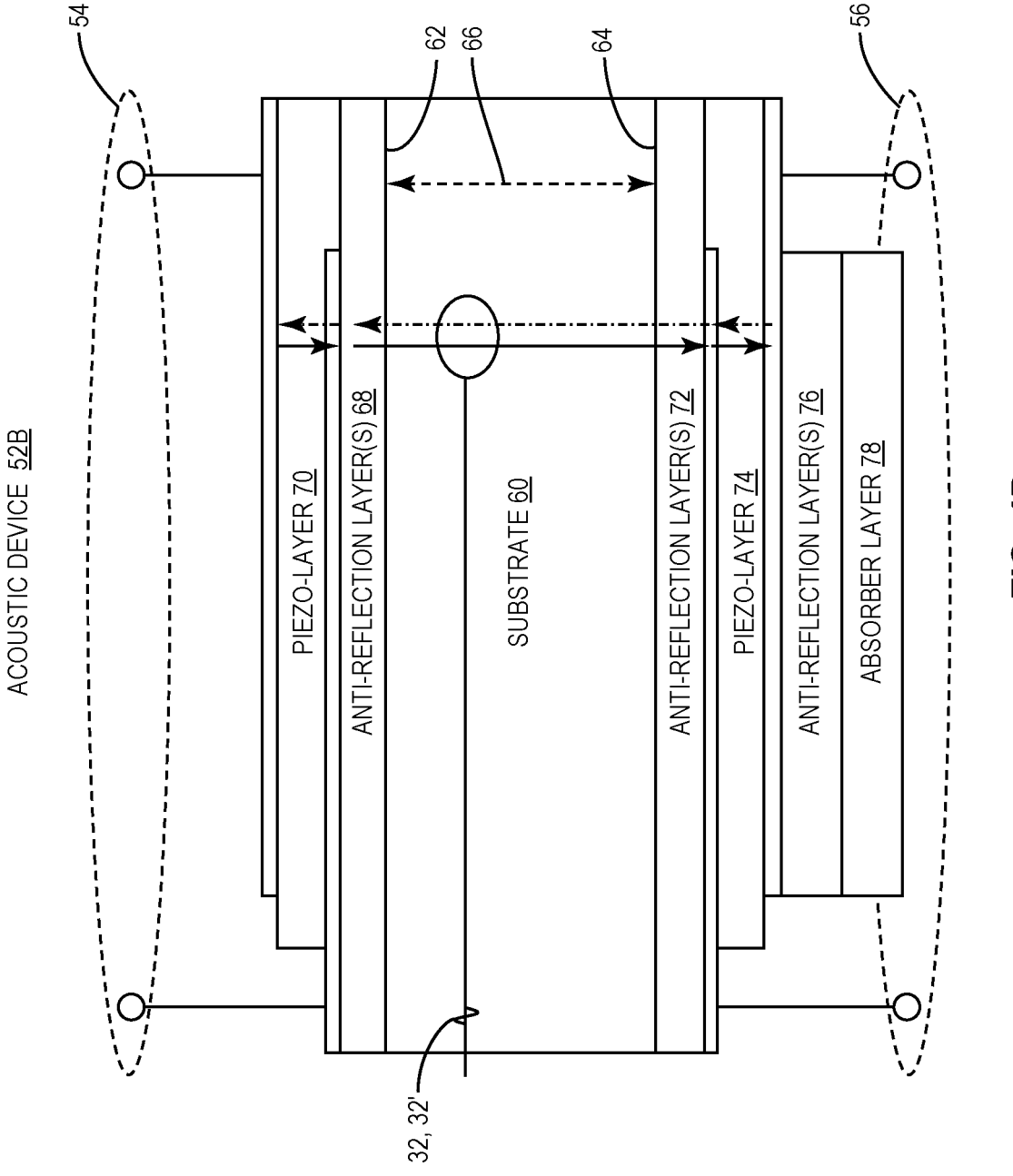

FIGS. 4A and 4B are schematic diagrams illustrating the acoustic device 52 configured according to various embodiments of the present disclosure. Common elements between FIGS. 3, 4A, and 4B are shown therein with common element numbers and will not be re-described herein.

FIG. 4A shows an acoustic device 52A configured according to one embodiment of the present disclosure. The acoustic device 52A includes a substrate 60. The substrate 60 has a first surface 62 and a second surface 64 that collectively define a thickness 66 of the substrate 60. Herein, the thickness 66 is predetermined to cause the temporal delay $\tau_a$ in the impulse waveform 32 and the echoed impulse waveform 32' when the impulse waveform 32 and the echoed impulse waveform 32' propagate through the substrate 60.

The acoustic device 52A also includes a first anti-reflection layer 68, a first piezo layer 70, a second anti-reflection layer 72, and a second piezo layer 74. The first anti-reflection layer 68 is provided on the first surface 62, the first piezo layer 70 is provided on the first anti-reflection layer 68, the second anti-reflection layer 72 is provided on the second surface 64, and the second piezo layer 74 is provided on the second anti-reflection layer 72.

FIG. 4B shows an acoustic device 52B configured according to another embodiment of the present disclosure. Herein, the acoustic device 52B further includes a third anti-reflection layer 76 and an absorber layer 78. The third anti-reflection layer 76 is provided on the second piezo layer 74 and the absorber layer 78 is provided on the third anti-reflection layer 76. In this embodiment, the absorber layer 78 is configured to absorb any reflection from the antenna port 38 resulting from an impedance mismatch between the wireless device 26 and the antenna 30.

Figure 5:
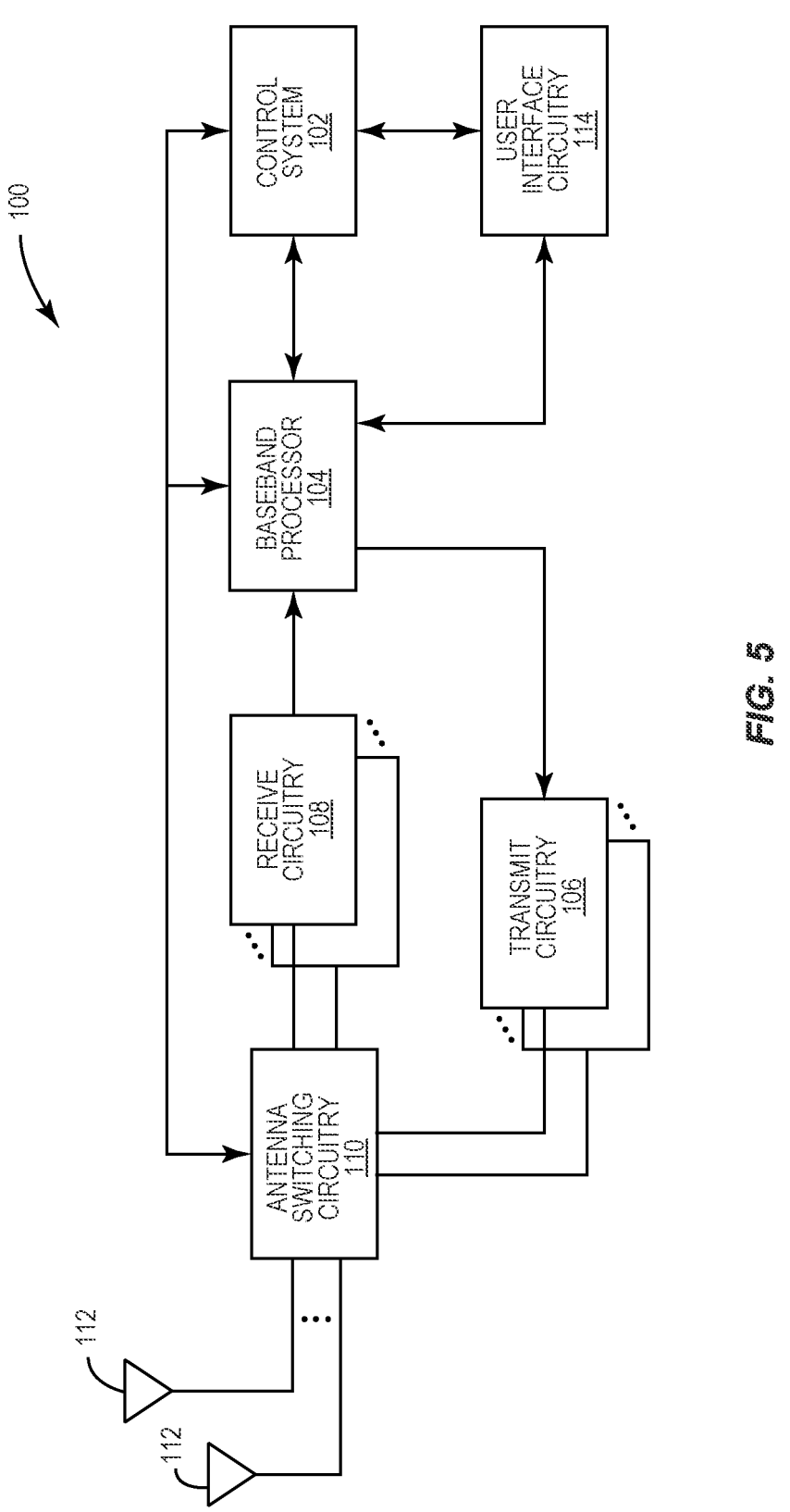
FIG. 5 is a schematic diagram of an exemplary user element wherein the wireless device of FIG. 2 can be provided.

The wireless device 26 of FIG. 2 can be provided in a user element to enable bandwidth adaptation according to embodiments described above. In this regard, FIG. 5 is a schematic diagram of an exemplary user element 100 wherein the wireless device 26 of FIG. 2 can be provided.

Herein, the user element 100 can be any type of user element, such as mobile terminals, smart watches, tablets, computers, navigation devices, access points, and like wireless communication devices that support wireless communications, such as cellular, wireless local area network (WLAN), Bluetooth, and near field communications. The user element 100 will generally include a control system 102, a baseband processor 104, transmit circuitry 106, receive circuitry 108, antenna switching circuitry 110, multiple antennas 112, and user interface circuitry 114. In a non-limiting example, the control system 102 can be a field-programmable gate array (FPGA), as an example. In this regard, the control system 102 can include at least a microprocessor(s), an embedded memory circuit(s), and a communication bus interface(s). The receive circuitry 108 receives radio frequency signals via the antennas 112 and through the antenna switching circuitry 110 from one or more base stations. A low noise amplifier and a filter cooperate to amplify and remove broadband interference from the received signal for processing. Downconversion and digitization circuitry (not shown) will then downconvert the filtered, received signal to an intermediate or baseband frequency signal, which is then digitized into one or more digital streams using analog-to-digital converter(s) (ADC).

The baseband processor 104 processes the digitized received signal to extract the information or data bits conveyed in the received signal. This processing typically comprises demodulation, decoding, and error correction operations, as will be discussed in greater detail below. The baseband processor 104 is generally implemented in one or more digital signal processors (DSPs) and application specific integrated circuits (ASICs).

For transmission, the baseband processor 104 receives digitized data, which may represent voice, data, or control information, from the control system 102, which it encodes for transmission. The encoded data is output to the transmit circuitry 106, where a digital-to-analog converter(s) (DAC) converts the digitally encoded data into an analog signal and a modulator modulates the analog signal onto a carrier signal that is at a desired transmit frequency or frequencies. A power amplifier will amplify the modulated carrier signal to a level appropriate for transmission, and deliver the modulated carrier signal to the antennas 112 through the antenna switching circuitry 110. The multiple antennas 112 and the replicated transmit and receive circuitries 106, 108 may provide spatial diversity. Modulation and processing details will be understood by those skilled in the art.

The wireless device 26 of FIG. 2 can be configured to detect the nearby object 28 based on a process. In this regard, FIG. 6 is a flowchart of an exemplary process 200 whereby the wireless device 26 of FIG. 2 can detect the nearby object 28.

Herein, the transmitter circuit 42 generates the impulse waveform 32 that includes the pulses 34(1)-34(X) (step 202). The antenna 30 then emits the impulse waveform 32 toward the object 28 (step 204). The antenna 30 also receives the echo 32' of the emitted impulse waveform 32 that includes the echoed pulses 34(1)'-34(X)' each corresponding to a respective one of the emitted pulses 34(1)-34(X) as reflected by the object 28 (step 206). The acoustic delay circuit 36 is configured to delay each of the impulse waveform 32 and the echo 32' of the emitted impulse waveform 32 by a temporal delay to thereby prevent each of the echoed pulses 34(1)'-34(X)' from overlapping with the respective one of the pulses 34(1)-34(X) (step 208).

Those skilled in the art will recognize improvements and modifications to the preferred embodiments of the present disclosure. All such improvements and modifications are considered within the scope of the concepts disclosed herein and the claims that follow.

What is claimed is:

1. A wireless device comprising:
a transmitter circuit configured to generate an impulse waveform;
an antenna port coupled to an antenna configured to emit the impulse waveform toward a nearby object and absorb an echo of the emitted impulse waveform reflected by the nearby object;
a receiver circuit configured to receive the echo of the emitted impulse waveform; and
an acoustic delay circuit configured to:
receive the impulse waveform from the transmitter circuit;
delay the impulse waveform by a temporal delay;
provide the delayed impulse waveform to the antenna port;
receive the echo of the emitted impulse waveform from the antenna port;
delay the echo of the emitted impulse waveform by the temporal delay such that the echo of the emitted impulse waveform is delayed from the impulse waveform by twice the temporal delay; and
provide the delayed echo of the emitted impulse waveform to the receiver circuit.

2. The wireless device of claim 1, wherein the impulse waveform is an ultra-wideband (UWB) waveform.

3. The wireless device of claim 1, further comprising a transceiver circuit configured to:
generate the impulse waveform comprising a plurality of pulses; and
receive the echo of the emitted impulse waveform comprising a plurality of echoed pulses each corresponding to a respective one of the plurality of pulses in the impulse waveform reflected by the nearby object;
wherein the acoustic delay circuit is further configured to delay each of the impulse waveform and the echo of the emitted impulse waveform by the temporal delay to thereby prevent each of the plurality of echoed pulses from overlapping with the respective one of the plurality of pulses at the receiver circuit.

4. The wireless device of claim 1, further comprising:
a transmit switch provided between the transmitter circuit and the acoustic delay circuit;
a receive switch provided between the acoustic delay circuit and the receiver circuit; and
a control circuit configured to:
close the transmit switch and open the receive switch to thereby provide the impulse waveform from the transmitter circuit to the acoustic delay circuit; and

close the receive switch and open the transmit switch to thereby provide the delayed echo of the emitted impulse waveform from the acoustic delay circuit to the receiver circuit.

5. The wireless device of claim 4, further comprising an echo cancellation circuit configured to cancel an undesired echo caused by a coupling between the transmit switch and the receive switch in the echo of the emitted impulse waveform.

6. The wireless device of claim 5, wherein the acoustic delay circuit comprises a shunt circuit configured to assist in pre-calibration of the echo cancellation circuit.

7. The wireless device of claim 1, wherein the acoustic delay circuit comprises:

an acoustic device configured to delay each of the impulse waveform and the echo of the emitted impulse waveform by the temporal delay; and a bypass switch configured to bypass the acoustic device.

8. The wireless device of claim 7, wherein the acoustic device comprises a substrate having a first surface and a second surface and corresponds to a thickness that causes the temporal delay in the impulse waveform and the echo of the emitted impulse waveform when the impulse waveform and the echo of the emitted impulse waveform propagate through the substrate.

9. The wireless device of claim 8, wherein the acoustic device further comprises:

a first anti-reflection layer provided on the first surface;

a first piezo layer provided on the first anti-reflection layer;

a second anti-reflection layer provided on the second surface; and a second piezo layer provided on the first anti-reflection layer.

10. The wireless device of claim 9, wherein the acoustic device further comprises:

a third anti-reflection layer provided on the second piezo layer; and an absorber layer provided on the third anti-reflection layer.

11. A method for detecting a nearby object comprising:

generating an impulse waveform and delaying the impulse waveform by a temporal delay;

emitting the impulse waveform toward the nearby object and absorbing an echo of the emitted impulse waveform reflected by the nearby object;

delaying the echo of the emitted impulse waveform by the temporal delay such that the echo of the emitted impulse waveform is delayed from the impulse waveform by twice the temporal delay; and receiving the delayed echo of the emitted impulse waveform.

12. The method of claim 11, further comprising:

generating the impulse waveform comprising a plurality of pulses;

emitting the impulse waveform toward the nearby object;

receiving an echo of the emitted impulse waveform comprising a plurality of echoed pulses each corresponding to a respective one of the plurality of pulses in the impulse waveform reflected by the nearby object; and delaying each of the impulse waveform and the echo of the emitted impulse waveform by the temporal delay to thereby prevent each of the plurality of echoed pulses from overlapping with the respective one of the plurality of pulses.

13. The method of claim 11, further comprising alternating between generating the impulse waveform and receiving the delayed echo of the emitted impulse waveform based on a time-division scheme.

14. The method of claim 13, further comprising cancelling an undesired echo in the delayed echo of the emitted impulse waveform.

15. The method of claim 11, wherein generating the impulse waveform comprises generating an ultra-wideband (UWB) waveform.

16. The method of claim 11, wherein delaying the echo of the emitted impulse waveform by the temporal delay comprises delaying the echo of the emitted impulse waveform using an acoustic delay circuit.

17. The method of claim 16, further comprising:

delaying, using an acoustic device, each of the impulse waveform and the echo of the emitted impulse waveform by the temporal delay; and bypassing the acoustic device using a bypass switch.

18. The method of claim 17, further comprising assembling the acoustic device to include a substrate corresponding to a thickness that causes the temporal delay in the impulse waveform and the echo of the emitted impulse waveform when the impulse waveform and the echo of the emitted impulse waveform propagate through the substrate.

19. The method of claim 18, further comprising:

providing a first anti-reflection layer on a first surface of the substrate;

providing a first piezo layer on the first anti-reflection layer;

providing a second anti-reflection layer on a second surface of the substrate; and providing a second piezo layer on the first anti-reflection layer.

20. The method of claim 19, further comprising:

providing a third anti-reflection layer on the second piezo layer; and providing an absorber layer on the third anti-reflection layer.

* * * * *